(No Model.)

J. D. WIRTH.
SELF LUBRICATING LOOSE PULLEY.

No. 380,007. Patented Mar. 27, 1888.

WITNESSES=
Walter W. Lovegrove,
George E. Wilcox.

INVENTOR=
John D. Wirth.
by Hinsdill Parsons
his attorney.

UNITED STATES PATENT OFFICE.

JOHN D. WIRTH, OF HOOSICK FALLS, NEW YORK.

SELF-LUBRICATING LOOSE PULLEY.

SPECIFICATION forming part of Letters Patent No. 380,007, dated March 27, 1888.

Application filed October 25, 1887. Serial No. 253,378. (No model.)

*To all whom it may concern:*

Be it known that I, JOHN D. WIRTH, a citizen of the United States, residing at Hoosick Falls, Rensselaer county, New York, have invented certain new and useful Improvements in Self-Lubricating Loose Pulleys, of which the following is a full, clear, and exact description, reference being had to the accompanying drawings, forming part of this specification.

My invention relates to self-lubricating loose pulleys, and its nature will be more fully hereinafter described, and pointed out in the claims.

Figure 1:
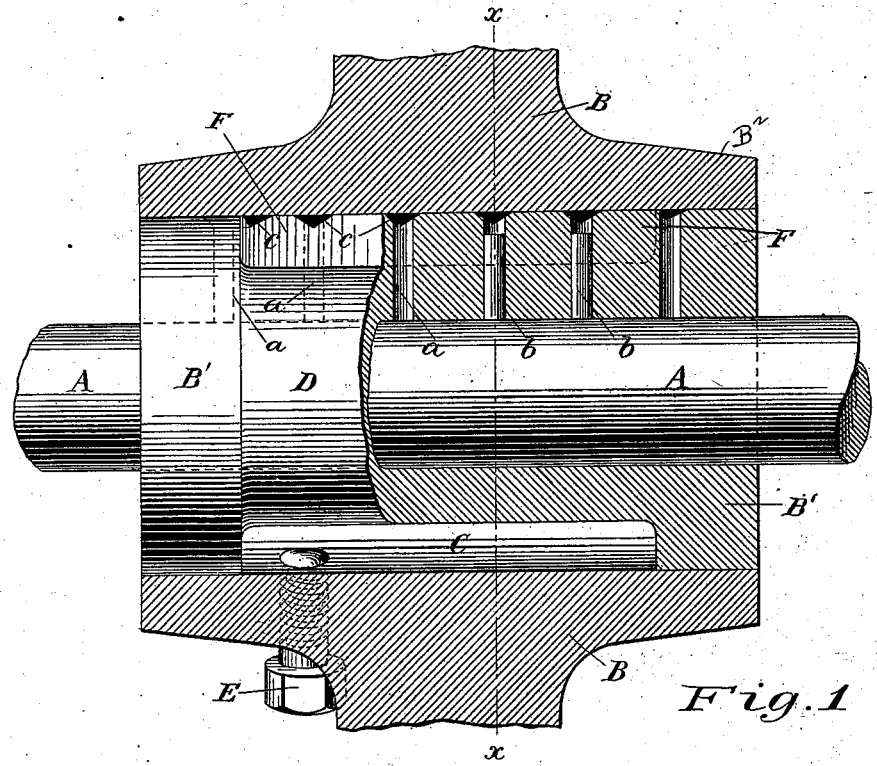
Figure 2:
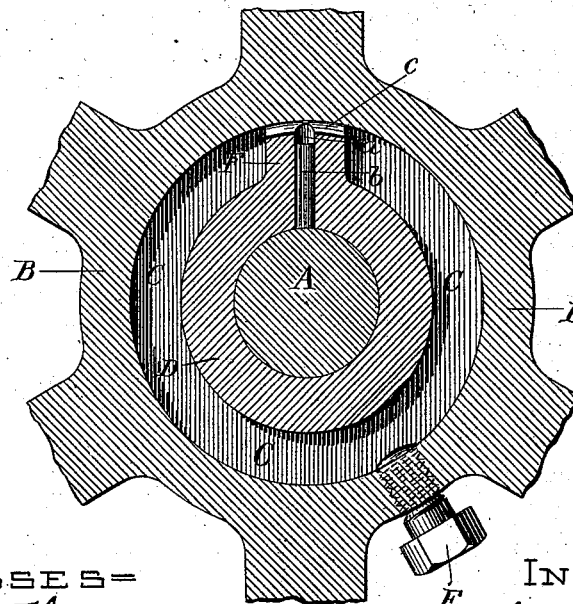

Referring to the drawings, in which similar letters of reference designate like parts, Figure 1 is a view, partly in elevation and partly in longitudinal vertical section, of a loose pulley embodying my invention. Fig. 2 is a vertical section through line $x\ x$, Fig. 1.

A is the shaft on which the loose pulley B revolves. The hole through the hub $B^2$ of the pulley is of sufficient size to receive the annular flanges B' of the separate tubular bushing D, which is driven into the hole in the pulley, fitting tightly therein, and forming a reservoir, C, for the oil between the flanges B', whose exterior vertical walls are flush with the vertical walls of the pulley. Oil is admitted to the reservoir C by removing the screw E. The separate tubular bushing D is further provided with the longitudinal projection F, extending from one annular flange to the other, and being flush therewith. The projection F is provided with the holes $a\ a$, communicating with the shaft A and with the oil-chamber C by the transverse ducts $c\ c$. Into the holes $a\ a$ are inserted a series of pins, $b\ b$, which are shorter than the holes $a\ a$, and are loose enough so that they are permitted a free play as the pulley revolves and work the oil admitted through the ducts $c\ c$ downward upon the shaft A, and the centrifugal force prevents their resting upon and wearing the shaft A.

It is obvious that two or more longitudinal projections may be used, or that the projections to receive the pins $b\ b$ may be annular instead of longitudinal, without departing from the spirit of my invention.

I am aware that self-lubricating loose pulleys having annular flanges at the end of a tightly-fitting separate tubular bushing and forming therewith an oil-chamber, and having also oil-passages communicating with the oil-chamber and the shaft, have hitherto been used; but these passages have been filled with some absorbent to conduct the oil to the shaft, and it has been found that the absorbent soon becomes cased over next the shaft, and the oil does not reach the shaft. This difficulty is obviated by my device, the pins $b$ admitting the oil to the shaft in proper quantity, and, being loose in the holes $a\ a$, gumming is avoided.

Having now described my invention, what I claim as new, and desire to secure by Letters Patent, is—

1. The combination, with a loose pulley, of a separate tubular bushing fitting in the hub of the pulley, said bushing provided with end flanges forming with the hub an oil-chamber, and a projection having a series of perforations extending to the shaft, and pins working loosely in said perforations, substantially as and for the purpose specified.

2. In combination with a loose pulley having an oil-passage through its hub, a tubular bushing provided with end flanges, a projecting rib, perforations through said ribs, ducts leading to said perforations, and pins in the perforations, substantially as and for the purpose specified.

In witness whereof I have hereunto set my hand this 18th day of October, 1887.

JOHN D. WIRTH.

Witnesses:
D. RUNKLE,
L. A. LINCOLN.